United States Patent [19]

McCloskey et al.

[11] Patent Number: 5,977,265
[45] Date of Patent: Nov. 2, 1999

[54] METHOD FOR PREPARING BROMINATED POLYCARBONATES, AND PRODUCTS OBTAINED THEREBY

[75] Inventors: Patrick Joseph McCloskey, Watervliet; Gary Charles Davis, Albany; David Michel Dardaris, Ballston Spa; Daniel Joseph Brunelle, Burnt Hills, all of N.Y.; Robert Russell Gallucci, Mt. Vernon, Ind.; Mahari Tjahjadi, Evansville, Ind.; David Whalen, Mt. Vernon, Ind.; Kevin Mitchell Snow, Mt. Vernon, Ind.

[73] Assignee: General Electric Company, Schenectady, N.Y.

[21] Appl. No.: 08/922,105

[22] Filed: Sep. 2, 1997

[51] Int. Cl.$^6$ ................................................ C08C 19/22
[52] U.S. Cl. .................... 525/374; 525/132; 525/383; 525/439; 525/447
[58] Field of Search .................................. 525/470, 469, 525/374, 383, 439, 447, 132

[56] References Cited

U.S. PATENT DOCUMENTS

| | | |
|---|---|---|
| 3,915,926 | 10/1975 | Wambach . |
| 3,936,400 | 2/1976 | Wambach . |
| 4,101,519 | 7/1978 | Hallgren ................................. 528/197 |
| 5,021,521 | 6/1991 | Krabbenhoft et al. . |
| 5,414,057 | 5/1995 | Campbell et al. . |

FOREIGN PATENT DOCUMENTS

| | | |
|---|---|---|
| 650096A2 | 10/1994 | European Pat. Off. . |
| 702044A1 | 3/1996 | European Pat. Off. . |
| 708130A1 | 4/1996 | European Pat. Off. . |
| 819 718 | 7/1996 | European Pat. Off. . |

Primary Examiner—Robert Dawson
Assistant Examiner—D. Aylward
Attorney, Agent, or Firm—Noreen C. Johnson; Douglas E. Stoner

[57] ABSTRACT

High flow brominated polycarbonates, useful as flame retardant additives for other polymers such as polyesters, are obtained by equilibration of a brominated aromatic polycarbonate such as a tetrabromobisphenol A homo- or copolycarbonate with a di- or polyhydroxy aromatic compound such as bisphenol A, or a diaryl carbonate, and an equilibration catalyst, under conditions such that the weight average molecular weight of the brominated polycarbonate is reduced by at least 35%. Preferred equilibration catalysts are Group I metal carboxylates, such as sodium stearate, and hexaalkylguanidinium salts.

24 Claims, No Drawings

METHOD FOR PREPARING BROMINATED POLYCARBONATES, AND PRODUCTS OBTAINED THEREBY

BACKGROUND OF THE INVENTION

This invention relates to flame retardant additives for polymers, and more particularly to a method for preparing brominated polymers useful as flame retardants.

The use of brominated polymers, especially polycarbonates, as flame retardant additives for other polymers has been known for some time. For example, U.S. Pat. Nos. 3,915,926 and 3,936,400 describe the preparation of polycarbonates derived from such brominated monomers as 2,2-bis(3,5-dibromo-4-hydroxyphenyl)propane, hereinafter sometimes designated "TBBPA", and the use of said polycarbonates as flame retardants for polyesters, such as poly(ethylene terephthalate) and poly(butylene terephthalate). Typically, the polymer employed is a TBBPA homopolymer or a copolymer of TBBPA with 2,2-bis(4-hydroxyphenyl) propane, hereinafter sometimes "bisphenol A". For the most part, it is an oligomer having a weight average molecular weight in the range of about 1,500–5,000, all weight average molecular weights herein being determined by gel permeation chromatography relative to polystyrene, since high molecular weight TBBPA polycarbonates tend to produce such high viscosities and glass transition temperatures in the flame retardant blend that processing is difficult or impossible.

Several disadvantages are encountered in the use of such TBBPA oligopolycarbonates as flame retardants. First, they are often expensive to manufacture, particularly since their preparation may require redirection of an existing polycarbonate manufacturing facility with a resulting loss in production of conventional polymers such as bisphenol A polycarbonates. Second, the molecular weights of the blends in which the TBBPA oligopolycarbonates are incorporated tend to change markedly when they are exposed to thermal aging in air. A typical TBBPA copolymer, for example, doubles the molecular weight of a base poly(1,4-butylene terephthalate) in which it is incorporated after about a day at 190° C., and the blend then loses molecular weight.

U.S. Pat. Nos. 5,021,521 and 5,414,057 describe the preparation of various types of polycarbonates by equilibration or redistribution. In such reactions, a high molecular weight polycarbonate is heated in the presence of a catalyst, and optionally a diaryl carbonate or di- or polyhydroxyaromatic compound, to produce a redistributed or equilibrated polycarbonate of a different, usually lower, molecular weight.

The catalysts employed according to said patents include a wide variety of chemical compounds, chiefly bases and Lewis acids. A strictly non-exhaustive list of examples includes alkali and alkaline earth metal carboxylates such as lithium stearate, hydrides such as sodium hydride, borohydrides such as sodium borohydride, organotin compounds such as di(n-butyl)tin oxide, titanate esters such as tetra-n-propyl titanate, and tetraalkylammonium compounds such as tetramethylammonium hydroxide, tetramethylammonium acetate and tetra-n-butylammonium tetraphenylborate. Copending, commonly owned application Ser. No. 08/768, 871 discloses hexaalkylguanidinium bisphenolates which are also useful as catalysts in a wide variety of equilibration reactions of this type.

Such an equilibration reaction (the word "equilibration" being used hereinafter for brevity to designate both equilibration and redistribution reactions) might be expected to be useful for producing brominated polycarbonates having suitable viscosity properties for use as flame retardants. It has been discovered, however, that many of the previously disclosed equilibration catalysts are not effective in the presence of brominated polycarbonates. This is true even though said catalysts are effective for equilibration of other polycarbonates, such as bisphenol A homopolycarbonates.

It is of interest, therefore, to develop a method of preparing brominated polycarbonates having high stability under thermal air aging conditions and having viscosities which are a good match for the polymers in which they are to be incorporated as flame retardant additives. It is further of interest to prepare such polymers by a relatively simple method such as equilibration.

SUMMARY OF THE INVENTION

The present invention provides a method for preparing such brominated polycarbonates. It further provides brominated polycarbonates which possess improved properties when employed as flame retardant additives in base polymers such as polyesters.

In one of its aspects, the invention is a method for preparing a high flow brominated polycarbonate resin which comprises equilibrating, at a temperature in the range of about 150–320° C., a mixture comprising:

(A) at least one brominated aromatic polycarbonate selected from the group consisting of homo- and copolycarbonates having a weight average molecular weight, as determined by gel permeation chromatography relative to polystyrene, in the range of about 25,000–100,000, (B) at least one equilibrating compound selected from the group consisting of diaryl carbonates and di- and polyhydroxy-aromatic compounds, and (C) at least one equilibration catalyst;

components B and C being capable, in the amounts employed and under the conditions of said equilibration, of reducing the weight average molecular weight of said brominated polycarbonate by at least 35%.

Another aspect of the invention is brominated aromatic polycarbonates prepared by the above-described method.

Still another aspect is a resinous composition comprising a polycarbonate-compatible polymer in combination with a flame retardant amount of said high flow brominated polycarbonate resin.

A still further aspect is a molded article comprising said resinous composition.

DETAILED DESCRIPTION; PREFERRED EMBODIMENTS

The materials defined as A, B and C hereinabove are frequently referred to hereinafter as "component A" and the like, irrespective of whether they actually function as components or as reactants.

Component A is at least one brominated aromatic polycarbonate. It may be a homopolycarbonate or, preferably, a copolycarbonate, both being prepared with the use of at least one brominated bisphenol. While any brominated bisphenol may be employed, the preferred one is TBBPA.

In the case of copolycarbonates, the bisphenol employed as a comonomer may be any bisphenol having the formula HO—A$^1$—OH, wherein A$^1$ is an aromatic radical. The preferred aromatic radicals have the formula $$-A^2-Y-A^3-, \quad (I)$$

wherein each of $A^2$ and $A^3$ is a monocyclic divalent aromatic hydrocarbon radical and Y is a bridging hydrocarbon radical in which one or two atoms separate $A^2$ from $A^3$. The free valence bonds in formula I are usually in the meta or para positions of $A^2$ and $A^3$ in relation to Y. Both $A^2$ and $A^3$ are preferably p-phenylene, although both may be o- or m-phenylene or one o- or m-phenylene and the other p-phenylene.

The bridging radical, Y, is one in which one or two atoms, preferably one, separate $A^2$ from $A^3$. Illustrative radicals of this type are methylene, cyclohexylmethylene, 2-[2.2.1] bicycloheptylmethylene, ethylene, isopropylidene, neopentylidene, cyclohexyl idene, cyclopentadecylidene, cyclododecylidene and adamantylidene; gem-alkylene (alkylidene) radicals are preferred. For reasons of availability and particular suitability for the purposes of this invention, the preferred bisphenol for use as a comonomer is bisphenol A, in which Y is isopropylidene and $A^2$ and $A^3$ are each p-phenylene.

The copolycarbonates employed as reagent A most often comprise about 30–80%, preferably about 30–70%, by weight of structural units derived from the brominated bisphenol. Their molecular weights are in the range of about 25,000–100,000 and preferably about 30,000–75,000.

Component B is at least one equilibrating compound which may be a diaryl carbonate such as diphenyl carbonate. Preferably, however, it is a di- or polyhydroxyaromatic compound. Dihydroxy and trihydroxy compounds are more preferred, with dihydroxy compounds being most preferred.

A preferred feature of the hydroxy compounds used as component B is the presence of at least one and preferably two unsubstituted carbon atoms in positions ortho to each of at least two hydroxy groups therein. This preference is a result of the fact that the use of such compounds is often particularly effective to afford a product having a melt viscosity in the preferred range noted hereinafter.

Hydroxy compounds suitable for use as component B include unsubstituted and substituted monocyclic compounds such as resorcinol and hydroquinone, and unsubstituted and substituted bisphenols of the type previously described. Illustrative bisphenols are bisphenol A, bis(4-hydroxyphenyl) ketone, bis(4-hydroxyphenyl)methane and bis(4-hydroxyphenyl) sulfone. An illustrative trihydroxy compound is 1,1,1-tris(4-hydroxyphenyl)ethane. Bisphenol A is usually preferred.

The invention is based in part on the discovery that of the many types of equilibration catalysts disclosed in the above-identified patents and application, only a comparative few are effective as component C according to the present invention. Predominant among these are the hexaalkylguanidinium salts and the Group I metal carboxylates.

Illustrative Group I metal carboxylates are sodium acetate, potassium acetate, sodium oleate, sodium stearate, potassium stearate and sodium linoleate. The preferred compounds are the stearates, with sodium stearate being most preferred.

The preferred hexaalkylguanidinium salts are the quaternary bisphenolates disclosed in the aforementioned copending application Ser. No. 08/768,871. They are illustrated by the molecular formula

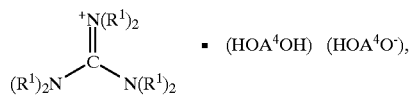 · (HOA$^4$OH) (HOA$^4$O$^-$), wherein $A^4$ is a divalent aromatic radical and $R^1$ is a $C_{1-6}$ alkyl radical, as illustrated by ethyl and n-butyl.

The $A^4$ radical may be a monocyclic radical; i.e., an unsubstituted or substituted m- or p-phenylene radical. Most often, however, it has the formula $$-A^5-Z-A^5-, \tag{III}$$

wherein $A^5$ is unsubstituted p-phenylene and Z is a single bond or a bridging radical wherein 1–2 atoms separate the $A^5$ values; i.e., $A^4$ is a bisphenol-derived moiety. The preferred moieties of this type are those in which $A^5$ is a p-phenylene and Z may be any bridging radical in which one or two atoms separate the two $A^5$ values. Illustrative Z radicals include methylene, ethylene, isopropylidene, 2,2-dichloroethylidene, oxygen, sulfur, sulfoxy and sulfone. It is also possible for Z to be a single bond, as is the case with 4,4'-biphenol. The preferred Z value is isopropylidene, which is present when the bisphenol employed in the preparation of the compound is bisphenol A.

The quaternary bisphenolates may be prepared by the reaction of dihydroxyaromatic compound of the formula $(HO)_2A^4$ with an alkali metal hydroxide and a guanidinium salt of the formula $[(R^1)_2N]_3C^+X^-$. The X value in the quaternary salt is halide, preferably bromide or chloride and most preferably chloride. Typical reaction temperatures are in the range of about 10–125° and preferably about 10–50° C. An inert atmosphere such as nitrogen or argon may be employed.

In a preferred method of preparation, the reaction takes place in an aqueous medium most often also containing a $C_{1-3}$ alkanol and preferably methanol. The quaternary bisphenolate is usually insoluble in water but soluble in the alkanol, and often precipitates spontaneously; if not, it can be precipitated by addition of water.

It is generally found convenient to initially form an alcoholic mixture of bisphenol and alkali metal hydroxide, whereupon the bisphenol dissolves as the alkali metal salt, and to add thereto an aqueous-alcoholic solution of the guanidinium salt. Another alternative is to combine the bisphenol and guanidinium salt and gradually add aqueous alkali metal hydroxide solution thereto. In the water-alkanol embodiment, ambient temperatures in the range of about 20–30° C. are generally preferred.

In still another procedure, a non-polar organic solvent such as toluene is employed. An aqueous alkaline solution of the guanidinium salt is added gradually to a combination of the bisphenol and refluxing solvent. The product precipitates out and can be purified by washing with water. Further purification of product obtained by any of these methods can be achieved by recrystallization, most often from an alkanol and preferably methanol.

Reactant proportions are not critical in the method for preparing the quaternary bisphenolates. For optimum yield, however, a bisphenol:guanidinium salt:alkali metal hydroxide molar ratio of 1:1:0.5–1.5 and especially 2:1:1 is preferred.

X-ray diffraction analysis of the product obtained from bisphenol A, hexaethylguanidinium chloride and sodium hydroxide has shown it to have the molecular structure of a double helix of anionic bisphenol A moieties interconnected via hydrogen bonds between two oxygen atoms through the three protons. The hexaethylguanidinium cationic moieties are ionically associated with the anionic double helix and most often are located within the pockets formed by the hydrogen bonds. A similar structure is postulated for other quaternary bisphenolates.

The method of this invention may be performed at temperatures in the range of about 150–3200° C., either in the melt or in solution in a relatively high boiling solvent such as o-dichlorobenzene or trichlorobenzene. Melt operations, especially continuous melt processing such as in an extruder, are generally preferred.

The proportions of components B and C employed are those which are effective to afford a product with the required degree of molecular weight reduction. For the most part, component B is present in the amount of about 0.5–3.0%, preferably about 1.0–3.0%, and component C in the amount of about 0.01–0.3%, both based on total reaction mixture (excluding solvent, if any).

It is sometimes found that an extruded product obtained from brominated polycarbonate alone is difficult to handle. For example, stranding through the extrusion die and pelletization may be difficult or even impossible owing to the brittleness of a low molecular weight brominated polycarbonate. Such operations may, however, be facilitated by blending (D) a toughness improving polymer with the components employed for equilibration. Ideally, the presence of such a toughness improving polymer will produce a maximum melt viscosity of 12,000 poise at 250° C., as explained hereinafter.

Suitable toughness improving polymers include polyesters, chiefly of the type employed as base resins as described hereinafter. Other polymers suitable for this purpose include olefin polymers such as polyethylene and olefin-ethylenically unsaturated ester copolymers such as ethylene-vinyl acetate and ethylene-ethyl acrylate. They are most often employed in the amount of about 5–25%, preferably about 10–20%, by weight based on total reaction mixture (excluding solvent, if any).

Whether performed in the melt or in solution, the method of the invention results in equilibration of component A to the extent that the molecular weight of the polycarbonate is reduced by at least 35%. It is also preferred that the product of equilibration have a melt viscosity at 250° C. up to about 12,000 poise. Melt viscosity can vary widely according to the test conditions; the conditions under which it is determined for the purposes of the invention are defined as follows:

Drying time and temperature—1 hour, 150° C.;
Preheating time—5 minutes;
Orifice—2.096 mm diameter, 8.00 mm length;
Weight—5 kg.

These changes in properties are accompanied by a high degree of utility of the products of the invention as flame retardant agents in polyesters and the like, particularly by reason of their stability under oxidative conditions at high temperatures and their close viscosity match with the base polymer.

The brominated polycarbonates of this invention are useful as flame retardant additives for polycarbonates and polycarbonate-compatible polymers. Polycarbonate-compatible polymers include ABS copolymers, styrene-acrylonitrile copolymers and polyesters.

The preferred polyesters are aromatic polyesters free from ethylenic unsaturation. They are illustrated by poly(alkylene dicarboxylates), which typically comprise structural units of the formula (VI)

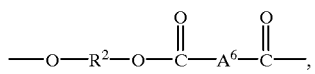

wherein $R^2$ is a saturated divalent aliphatic or alicyclic hydrocarbon radical containing about 2–12 and usually about 2–8 carbon atoms and $A^6$ is a divalent aromatic radical containing about 6–20 carbon atoms. Poly(alkylene dicarboxylates) are typically prepared by the reaction of at least one alkanediol such as ethylene glycol or 1,4-butanediol with at least one aromatic dicarboxylic acid such as isophthalic, terephthalic or naphthalenedicarboxylic acid, or lower alkyl ester thereof. The most preferred polyesters are crystalline polyesters such as poly(ethylene terephthalate) and poly(1,4-butylene terephthalate), the latter hereinafter sometimes designated "PBT".

The brominated polycarbonate is present in the resinous compositions of this invention in an amount effective for flame retardation. This amount is generally in the range of about 15–50% by weight based on total resinous composition, including other additives present therein.

Other additives may include reinforcing or non-reinforcing fillers such as glass fibers, flame retardation synergists such as antimony trioxide ($Sb_2O_3$) and anti-drip agents such as polytetrafluoroethylene. The preferred proportions of these other additives, again based on total resinous composition, are about 10–40%, about 1–5% and about 0.1–1.0% by weight respectively.

Various stabilizers may also be incorporated. These may include carbonate-ester interchange quenchers, which are employed to suppress breakage of ester linkages in the polycarbonate and polyester and their replacement by alkylene carbonate and aryl carboxylate bonds, which can result in degradation of the physical properties of the blend.

The quenchers are typically used at a level of about 0.01–3.0% and preferably about 0.01–2.0% by weight of the blend. They include acidic phosphate salts; acidic alkyl, aryl and mixed phosphites having at least one hydrogen or alkyl group; Group IB and Group IIB metal phosphate salts; phosphorus oxoacids; and metal acid pyrophosphates.

A more complete description of such quenchers is present in U.S. Pat. No. 5,441,997, the disclosure of which is incorporated by reference herein. The suitability of a particular compound for use as a stabilizer and the determination of how much is to be used as a stabilizer may be readily determined by preparing a mixture of the polyester, polycarbonate and filler with and without the particular compound and determining the effect on melt viscosity or color stability or the formation of interpolymers.

Stabilizers other than the above-described quenchers, when employed, are generally present in amounts less than 1% by weight.

The molded articles of the invention may be prepared by conventional molding techniques such as injection molding. The preferred molded articles for many purposes are electrical devices, especially electrical connectors.

The invention is illustrated by the following examples. All parts and percentages are by weight.

EXAMPLE 1

Solutions in o-dichlorobenzene of a brominated copolycarbonate having a molecular weight of 40,500 and consisting of bisphenol A and TBBPA structural units in a weight ratio of about 1:1 were combined with 0.1 mole percent of various catalysts and 2 mole percent of diphenyl carbonate. The resulting mixtures were heated under reflux for various times, after which the molecular weights were determined.

The results are given in Table I. The catalyst identified as "(HEG)(BPA)$_2$" was a hexaethylguanidinium bisphenolate prepared from bisphenol A and having a molecular formula corresponding to a stoichiometry of one hexaethylguanidinium cation, two bisphenol A dianions and three protons. For comparison, a control was run with component A in the absence of catalyst and diphenyl carbonate.

TABLE I

| Catalyst | Time, min. | MW | MW decrease, % |
|---|---|---|---|
| Control | | 40,500 | 0 |
| Diethyldimethylammonium hydroxide | 5 | 37,900 | 6.4 |
| Diethyldimethylammonium hydroxide | 20 | 37,500 | 7.4 |

TABLE I-continued

| Catalyst | Time, min. | MW | MW decrease, % |
|---|---|---|---|
| Diethyldimethylammonium hydroxide | 60 | 37,800 | 6.7 |
| Tetraisopropyl titanate | 5 | 35,800 | 11.6 |
| " | 20 | 32,900 | 18.8 |
| " | 60 | 28,400 | 29.9 |
| (HEG)(BPA)$_2$ | 5 | 33,100 | 18.3 |
| " | 20 | 29,500 | 27.2 |
| " | 60 | 26,900 | 33.6 |
| Tetra-n-butylammonium tetraphenylborate | 5 | 39,900 | 1.5 |
| Tetra-n-butylammonium tetraphenylborate | 20 | 38,400 | 5.2 |
| Tetra-n-butylammonium tetraphenylborate | 60 | 37,700 | 6.9 |

It will be apparent form Table I that while none of the catalysts employed produced a molecular weight within the scope of the invention within 60 minutes, the most pronounced reduction in molecular weight was obtained with the hexaethylguanidinium bisphenolate which, after 60 minutes, closely approached the threshold molecular weight reduction value of 35%. It can be expected that a refluxing period slightly longer than 60 minutes with the hexaethylguanidinium bisphenolate would produce a molecular weight decreases of at least 35%. The same is not true of the other catalysts listed.

EXAMPLE 2

Samples of the brominated copolycarbonate employed as a reactant in Example 1 where combined with tetramethylammonium hydroxide (TMAH), the hexaethylguanidinium bisphenolate or a combination of the two and, in some instances, 1%, based on component A, of bisphenol A. The resulting blends were extruded on a twin screw extruder at 260° C., and the molecular weights and melt flow rates (in grams per 10 minutes at 260° C. and 1.2 kg) were determined, The results are given in Table II, in comparison with those for similarly extruded portions of a commercial bisphenol A homopolycarbonate. Control samples of brominated copolycarbonate and bisphenol A homopolycarbonate were extruded without addition of either catalyst or bisphenol A. The values for "% molecular weight decrease" in extruded samples were calculated by comparison to the molecular weight of the appropriate control sample before extrusion : 40,500 for brominated copolycarbonate and 52,000 for bisphenol A homopolycarbonate.

It will be apparent that while each of the two catalysts employed (singly or in combination) for the equilibration of a bisphenol A homopolycarbonate afforded a substantial molecular weight reduction and increase in melt flow even in the absence of monomeric bisphenol A, the same was not true of the TBBPA copolycarbonate. For the latter, it was necessary to employ both monomeric bisphenol A and a catalyst comprising the hexaethylguanidinium bisphenolate in order to achieve a molecular weight reduction within the required range combined with a substantial increase in melt flow.

EXAMPLE 3

Samples of the brominated copolycarbonate employed as a reactant in Example 1 were extruded with various proportions of bisphenol A and, as catalysts, those employed in Example 2 as well as diethyidimethylammonium hydroxide (DEDMAH) and sodium stearate. Extrusion was performed at 250° C. on a 40-mm twin screw extruder with vacuum venting. In some of the runs, a PBT was present having a melt viscosity, under the previously described conditions, of 1,240 poise; also, in some runs conventional antioxidants were present but their presence was found not to affect the molecular weight or melt viscosity results.

The results are given in Table III. All melt viscosities were below 12,000 poise. Molecular weights of the polycarbonates prepared in admixture with polyesters were determined by dissolving the polycarbonate in chloroform and removing insoluble polyester by filtration, first through a filter aid material and a second time through a 50-micron syringe filter.

TABLE III

| Run | Catalyst Identity | % | Bisphenol A, % | PBT, % | MW | % decrease |
|---|---|---|---|---|---|---|
| 1 | DEDMAH | 0.05 | 0 | 0 | 29,800 | 26.4 |
| 2 | DEDMAH | 0.05 | 1 | 12 | 27,800 | 31.4 |
| 3 | DEDMAH | 0.07 | 1 | 0 | 28,700 | 29.1 |
| 4 | TMAH (HEG)(BPA)$_2$ | 0.05 0.03 | 1.5 | 12 | 18,700 | 53.8 |
| 5 | TMAH (HEG)(BPA)$_2$ | 0.05 0.02 | 1 | 12 | 20,200 | 50.1 |
| 6 | TMAH | 0.05 | 1 | 12 | 27,100 | 33.1 |
| 7 | (HEG)(BPA)$_2$ | 0.01 | 1 | 12 | 26,000 | 35.8 |
| 8 | (HEG)(BPA)$_2$ | 0.02 | 1 | 12 | 25,900 | 36.0 |
| 9 | (HEG)(BPA)$_2$ | 0.03 | 1 | 12 | 23,500 | 42.0 |

TABLE II

| Run | Resin | Catalyst Identity | Catalyst Quantity, ppm | Bisphenol A Quantity, % | MW | MW decrease, % | Melt flow |
|---|---|---|---|---|---|---|---|
| 1 | TBBPA/BPA | — | 0 | 0 | 36,000 | 11.1 | 4.0 |
| 2 | " | TMAH | 500 | 1.0 | 23,900 | 41.0 | 1.2 |
| 3 | " | (HEG)(BPA)$_2$ | 200 | 1.0 | 21,800 | 46.2 | 5.1 |
| 4 | " | TMAH (HEG)(BPA)$_2$ | 500 200 | 1.0 | 22,700 | 44.0 | 5.2 |
| 5 | BPA | — | 0 | 0 | 52,000 | | 1.34 |
| 6 | " | TMAH | 500 | | 22,600 | 56.5 | 34 |
| 7 | " | TMAH | 500 | 1.0 | 18,800 | 63.8 | 66 |
| 8 | " | (HEG)(BPA)$_2$ | 200 | 1.0 | 30,000 | 42.3 | 13 |
| 9 | " | TMAH (HEG)(BPA)$_2$ | 500 200 | 1.0 | 17,300 | 66.7 | 102 |

TABLE III-continued

| Run | Catalyst Identity | % | Bisphenol A, % | PBT, % | MW | % decrease |
|---|---|---|---|---|---|---|
| 10 | (HEG)(BPA)$_2$ | 0.02 | 1 | 12 | 21,900 | 459 |
| 11 | Na stearate | 0.01 | 1 | 12 | 23,600 | 41.7 |

It will be apparent that a molecular weight decrease of at least 35% was noted in each run except Runs 1–3 and 6, in which tetralkylammonium hydroxides were employed as the only catalysts.

EXAMPLE 4

The procedure employed was essentially the same as in Example 3, except that the catalyst employed in each run was sodium stearate and the extrusion temperature was 288° C. The results are given Table IV.

TABLE IV

| Run | Na stearate, % | Bisphenol A, % | PBT, % | MW | % decrease | Melt viscosity, poise |
|---|---|---|---|---|---|---|
| 1 | 0 | 0 | 0 | 43,500 | 0 | >100,000 |
| 2 | 0 | 1.5 | 0 | 43,500 | 0 | >100,000 |
| 3 | 0.05 | 0 | 0 | 36,500 | 9.9 | >100,000 |
| 4 | 0.01 | 1.5 | 15 | 20,700 | 48.9 | 8,800 |
| 5 | 0.02 | 1.5 | 15 | 18,800 | 53.6 | 4,630 |
| 6 | 0.03 | 1.5 | 15 | 17,200 | 57.5 | 4,670 |
| 7 | 0.05 | 0.5 | 0 | 27,600 | 31.9 | 30,050 |
| 8 | 0.05 | 0.5 | 15 | 22,200 | 45.2 | 20,280 |
| 9 | 0.05 | 0.5 | 15 | 25,600 | 36.8 | 12,680 |
| 10 | 0.05 | 1.0 | 15 | 21,600 | 46.7 | 11,060 |
| 11 | 0.05 | 1.0 | 15 | 22,700 | 44.0 | 10,810 |
| 12 | 0.05 | 1.5 | 15 | 17,100 | 57.8 | 4,430 |
| 13 | 0.05 | 1.5 | 15 | 17,700 | 56.3 | 4,870 |

These results show that the presence of both an effective catalyst, in this case sodium stearate, and bisphenol A is required for a molecular weight reduction of at least 35%, since a smaller reduction or none at all was observed in Runs 1–3 in which at least one of those materials was absent. (In Run 7, the molecular weight reduction approached the required figure although it fell somewhat short of it.) It is also apparent that substantial melt viscosity reduction required the presence of at least one of sodium stearate and bisphenol A, and was optimized when bisphenol A was present in the amount of at least 1.0%.

EXAMPLE 5

The procedure of Example 4 was employed to determine the effectiveness of various metal salts as equilibration catalysts for molecular weight reduction of the brominated copolycarbonate. In each run, the equilibration catalyst was present in the amount of 0.5%, bisphenol A in the amount of 1.0% and PBT in the amount of 15%. The results are given in Table V.

TABLE V

| Run | Catalyst | MW | % decrease | Melt viscosity, poise |
|---|---|---|---|---|
| 1 | Na stearate | 18,500 | 54.3 | 7,090 |
| 2 | K stearate | 18,300 | 54.8 | 5,720 |
| 3 | Na benzoate | 18,500 | 54.3 | 5,510 |

TABLE V-continued

| Run | Catalyst | MW | % decrease | Melt viscosity, poise |
|---|---|---|---|---|
| 4 | Na carbonate | 17,600 | 56.5 | 9,540 |
| 5 | Na bicarbonate | 18,100 | 55.3 | 12,000 |
| 6 | Zn stearate | 34,600 | 14.6 | 22,630 |
| 7 | Ca stearate | 30,800 | 24.0 | 14,670 |
| 8 | Mg stearate | 30,600 | 24.4 | 9,100 |

The results show the effectiveness of the sodium and potassium salts to effect the desired molecular weight reduction and a melt viscosity within the preferred range. The stearates of zinc, calcium and magnesium, on the other hand, did not afford the desired degree of molecular weight reduction and, in some instances, failed to decrease melt viscosity as preferred.

EXAMPLE 6

The procedure of Example 4 was employed to evaluate the effectiveness of various dihydroxyaromatic compounds as component B. Each dihydroxyaromatic compound was employed in the amount of 1%, and sodium stearate and PBT were employed in the amounts of 0.05% and 15% respectively. The results are given in Table VI.

TABLE VI

| Run | Component B | MW | % decrease | Melt viscosity |
|---|---|---|---|---|
| 1 | 2,2',6,6'-tetrabromo-3,3',5,5'-tetramethyl-4,4'-biphenol | 23,500 | 42.0 | 18,400 |
| 2 | 4,4'-Biphenol | 17,800 | 56.0 | 10,630 |
| 3 | Bis(4-hydroxyphenyl) sulfone | 20,300 | 49.9 | 8,400 |
| 4 | Hydroquinone | 13,500 | 66.7 | 2,500 |
| 5 | Bisphenol A | 18,400 | 54.6 | 7,090 |

While each dihydroxyaromatic compound employed decreasesed the molecular weight of the polycarbonate by the desired amount, the bisphenol used in Run 1, which does not contain hydrogen atoms in the positions ortho to the hydroxy groups, did not decrease the melt viscosity as preferred.

EXAMPLE 7

An equilibrated brominated polycarbonate similar to that of Runs 12–13 in Example 4 was prepared and found to have a melt viscosity of about 3,200 poise, determined under the following conditions:

Drying time and temperature—1 hour, 1500° C.;

Preheating time—none;

Orifice—1.067 mm diameter, 15.621 mm. length;

Weight—21.6 kg.

This brominated polycarbonate was a close viscosity match with the PBT employed in Example 3, which had a viscosity of 1,240 poise under the same conditions. By contrast, commercially employed TBBPA polycarbonate oligomers having a molecular weight of about 1,500 had viscosities too low to measure.

A blend was prepared by extruding in a single screw extruder at 250° C. the following materials:

PBT—44.25 parts;

Brominated polycarbonate—22 parts;

Glass fibers—30 parts;

Concentrate of 85% of antimony trioxide and 15% ethylene-vinyl acetate copolymer—3 parts;

Mixture of 50% polytetrafluoroethylene and 50% styreneacrylonitrile copolymer—0.6 part;

Phosphoric acid (quencher)—0.05 part;

Hindered phenol antioxidant—0.1 part.

The blend was easily prepared and extruded by reason of the close viscosity match of the PBT and the brominated copolycarbonate. UL-94 test specimens with thicknesses of 1.6 and 0.8 mm were injection molded at 121° C. and a 650° C. mold temperature, and were found to have a flammability rating of V-0.

What is claimed is:

1. A method for preparing a high flow brominated polycarbonate resin which comprises equilibrating, at a temperature in the range of about 150–300° C., a mixture comprising:

(A) at least one brominated aromatic polycarbonate selected from the group consisting of homo- and copolycarbonates having a weight average molecular weight, as determined by gel permeation chromatography relative to polystyrene, in the range of about 25,000–100,000, (B) at least one equilibrating compound selected from the group consisting of diaryl carbonates and di- and polyhydroxyaromatic compounds, and (C) at least one equilibration catalyst selected from the group consisting of a hexaalkylquanidinium salt and a group I metal carboxylate;

components B and C being capable, in the amounts employed and under the conditions of said equilibration, of reducing the weight average molecular weight of said polycarbonate by at least 35%.

2. A method according to claim 1 wherein the brominated polycarbonate is a 2,2-bis(3,5-dibromo-4-hydroxy-phenyl) propane polycarbonate.

3. A method according to claim 2 wherein the equilibration is performed in the melt.

4. A method according to claim 2 wherein the brominated polycarbonate is a copolycarbonate comprising about 30–70% by weight of structural units derived from 2,2-bis (3,5-dibromo-4-hydroxyphenyl)propane with the balance being units derived from bisphenol A.

5. A method according to claim 2 wherein reagent A has a weight average molecular weight, as determined by gel permeation chromatography relative to polystyrene, in the range of about 30,000–75,000.

6. A method according to claim 2 wherein component B is a dihydroxyaromatic compound having two unsubstituted carbon atoms in positions ortho to each of the hydroxy groups.

7. A method according to claim 6 wherein component B is bisphenol A.

8. A method according to claim 2 wherein the proportion of component C is present in the amount of about 0.01–0.3% based on total reaction mixture excluding any solvent.

9. A method according to claim 1 wherein component C is sodium stearate.

10. A method according to claim 1 wherein component C is a compound of the formula

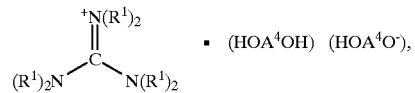

wherein $A^4$ is a divalent aromatic radical and $R^1$ is a $C_{1-6}$ alkyl radical.

11. A method according to claim 10 wherein $R^1$ is ethyl and $A^4$ is a radical derived from bisphenol A.

12. A method according to claim 2 wherein component B is present in the amount of about 0.5–3.0% based on total reaction mixture excluding any solvent.

13. A method according to claim 2 wherein the mixture further comprises (D) a toughness improving polymer.

14. A method according to claim 13 wherein component D is a polyester, olefin polymer or olefin-ethylenically unsaturated ester copolymer.

15. A method according to claim 14 wherein component D is poly(1,4-butylene terephthalate).

16. A method according to claim 14 wherein component D is present in the amount of about 5–25% by weight based on total reaction mixture excluding any solvent.

17. A method according to claim 2 wherein the conditions of the equilibration reaction are such that the product thereof has a melt viscosity at 250° C. up to about 12,000 poise, as determined under the following conditions:

Drying time and temperature—1 hour, 1500° C.;

Preheating time—5 minutes;

Orifice—2.096 mm diameter, 8.00 mm length;

Weight—5 kg.

18. A brominated polycarbonate prepared by the method of claim 13.

19. A resinous composition comprising a polycarbonate-compatible polymer in combination with a flame retardant amount of a composition according to claim 18.

20. A composition according to claim 19 wherein the polycarbonate-compatible polymer is a polyester.

21. A composition according to claim 20 wherein the polyester is poly(1,4-butylene terephthalate).

22. A composition according to claim 20 further comprising at least one of fillers, flame retardation synergists, anti-drip agents and stabilizers.

23. A molded article comprising the composition of claim 19.

24. An article according to claim 21 which is an electrical connector.

* * * * *